(No Model.)  3 Sheets—Sheet 1.
S. FOX.
MACHINE FOR CUTTING FLUE HOLES IN BOILER HEADS.
No. 263,039.  Patented Aug. 22, 1882.
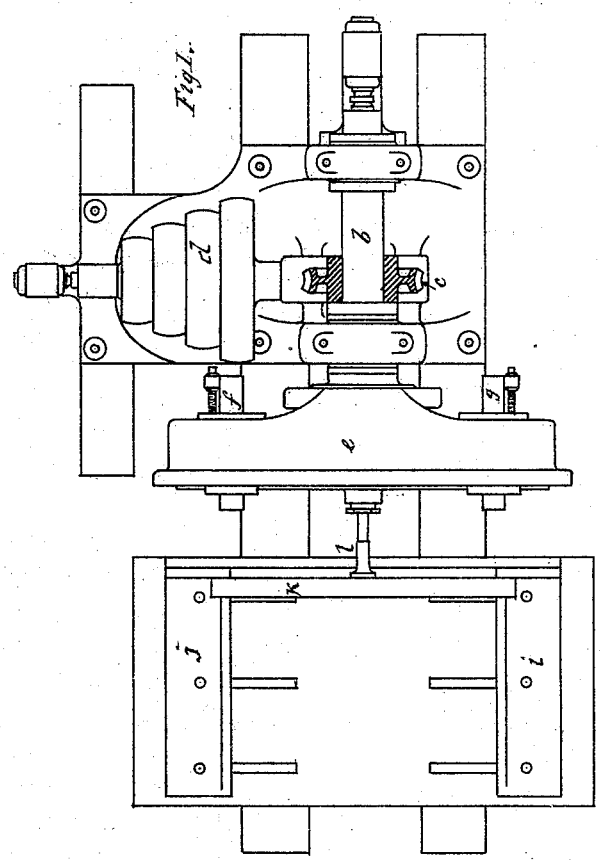
Witnesses.
Vinton Coombs
Robert Everett.
Inventor.
Samson Fox.
By J. J. Coombs,
Atty.

(No Model.) 3 Sheets—Sheet 2.
S. FOX.
MACHINE FOR CUTTING FLUE HOLES IN BOILER HEADS.
No. 263,039. Patented Aug. 22, 1882.
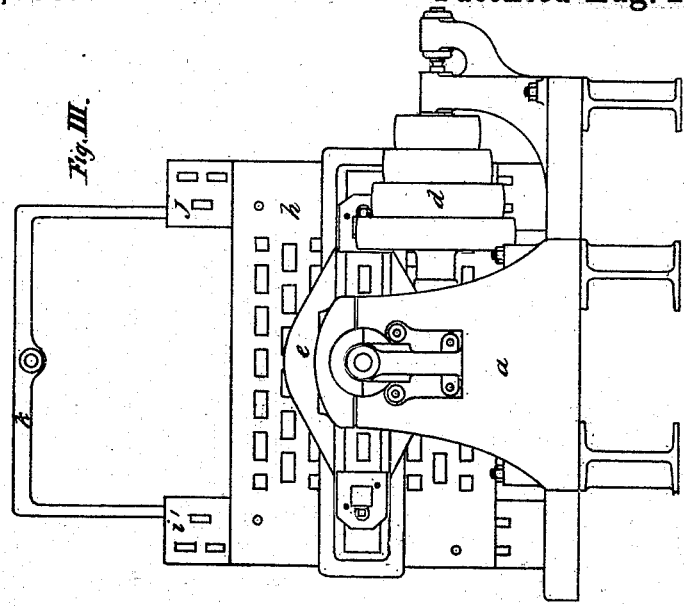
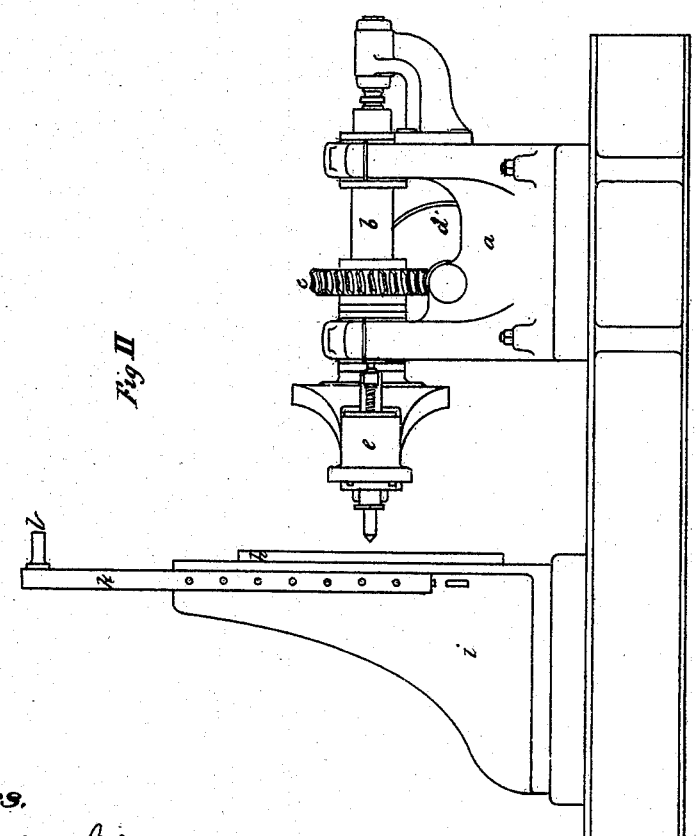
Witnesses.
Vinton Coombs
Robert Everett.
Inventor.
Samson Fox.
By J. J. Coombs,
Atty.

(No Model.) 3 Sheets—Sheet 3.
S. FOX.
MACHINE FOR CUTTING FLUE HOLES IN BOILER HEADS.
No. 263,039. Patented Aug. 22, 1882.
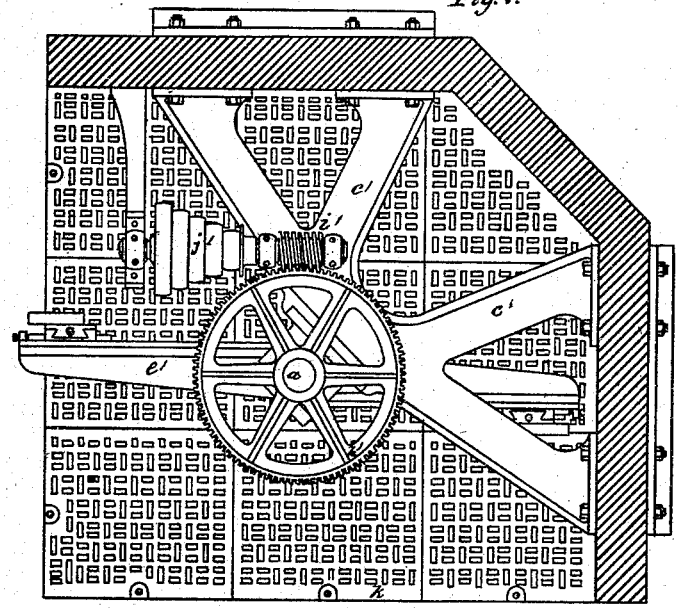
Fig. V.
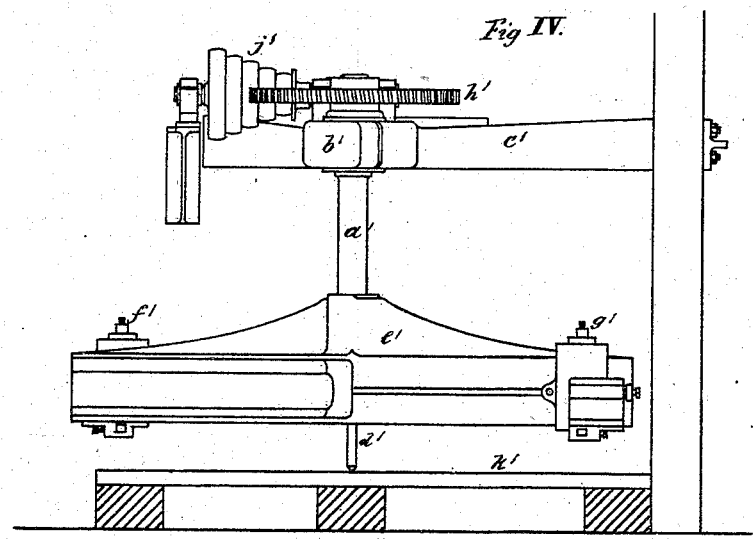
Fig. IV.
Witnesses.
Linton Coombs
Robert Errett
Inventor.
Samson Fox.
By J. J. Coombs,
Atty.

UNITED STATES PATENT OFFICE.

SAMSON FOX, OF LEEDS, COUNTY OF YORK, ENGLAND.

MACHINE FOR CUTTING FLUE-HOLES IN BOILER-HEADS.

SPECIFICATION forming part of Letters Patent No. 263,039, dated August 22, 1882.

Application filed April 5, 1882. (No model.)

To all whom it may concern:

Be it known that I, SAMSON FOX, a citizen of England, residing at the town of Leeds, in the county of York, England, have invented certain new and useful Improvements in Machinery for the Manufacture of Flanged Plates for Steam-Boilers and for Cutting Flue-Holes, &c.; and I do hereby declare the following to be a full, clear, and exact description of the invention, such as will enable others skilled in the art to which it appertains to make and use the same.

My improvements are in machinery connected with cutting the holes through the front and back plates of steam-boilers previous to their being flanged for the flues to be fitted into.

In the accompanying drawings, Figure I is a top or plan view of my machine. Fig. II is a side view, and Fig. III an end view, in elevation; and Figs. IV and V show a modification of the machine, in which the spindle carrying the cutter-head works vertically, and other parts are arranged accordingly.

I use a suitable lathe head-stock, $a$, having a spindle, $b$, fitted with a worm-wheel, $c$, which is driven by a worm on the same shaft as the speed-cone $d$. On the spindle is a cutter-head, $e$, with two tool-holders, $f$ and $g$, which are set up by hand as the head revolves, thus cutting through the plate. Opposite the cutter-head is a face-plate, $h$, with bolt-holes cast in, fixed to two strong uprights, $i$ and $j$, on the same bed as the head-stock $a$. On these uprights is a wrought-iron bracket, $k$, which can be raised or lowered at will, carrying a pin, $l$, to mount the plates on. The center of this pin is on a line vertical to the center of the spindle. The plate is hung on the stud on the same center as it is intended to flange round the outside on, and fixed to the face-plate $h$ by bolts. This gives a very ready mode of moving from hole to hole, they being all at a common radial distance from the center. After the holes have been flanged they are again put in this machine and mounted as before, for the purpose of having the edges of the said flange trimmed up and cut down to the proper height.

Another form of my improved machinery (shown in Figs. IV and V) I use vertically for cutting the edges of boiler-front plates after they have been flanged. It consists of a vertical spindle, $a'$, carried by a good long top bearing, $b'$, connected to overhanging brackets $c'$ fastened to a corner-wall and having a good strong center pin, $d'$, in its lower end, and taking into a center hole in the front plate to be operated on. On the lower part of this spindle $a'$ is a cross-arm, $e'$, having two movable slides, $f'$ and $g'$, carrying tool-boxes, which can be set at any required distance from the center of spindle. The top of the spindle is fitted into a large worm-wheel, $h'$, and driven by a suitable worm, $i'$, and speed-cone $j'$.

The mode of fixing the work to be operated on is as follows: The center hole of boiler-front plate, which has been the guide for flanging the outside to, is placed under the center pin of the vertical spindle, and the body of the boiler-front plate is secured to the holding-down plates $k'$ by means of the bolts, thus leaving the flanging free to be operated on.

It will be seen that this mode of fixing saves much time over the ordinary way of fastening to a lathe face-plate and revolving the work.

Heretofore in machines of this class the plate to be operated upon has been fixed to a revolving-lathe face-plate, which requires a long time; but in my machine the work is fixed to a stationary plate, and needs no balancing, as in case of a lathe. Therefore,

What I claim is—

The combination of the head-stock $a$, spindle $b$, worm-wheel $c$, and cutter-head $e$, arranged substantially as described, whereby the plate to be operated upon remains stationary, while the cutting mechanism revolves, whether said devices are arranged to work horizontally or vertically, as described.

In testimony whereof I affix my signature in presence of two witnesses.

SAMSON FOX.

Witnesses:
 JOSEPH HODGSON VEVERS,
 HENRY SKIRROW LEUTY,
Clerks to Messieurs Teale & Appleton, Solicitors, Leeds, England.